(12) United States Patent
Potts et al.

(10) Patent No.: US 11,921,086 B2
(45) Date of Patent: Mar. 5, 2024

(54) SENSOR MOUNTING PAD WITH SECONDARY RESTRAINT FEATURE

(71) Applicant: RMCI, Inc., Huntsville, AL (US)

(72) Inventors: Stephen Cary Potts, Huntsville, AL (US); Patrick Duane Hall, Woodville, AL (US); Jeremy Scott Branning, Woodville, AL (US)

(73) Assignee: RMCI, Inc., Huntsville, AL (US)

( * ) Notice: Subject to any disclaimer, the term of this patent is extended or adjusted under 35 U.S.C. 154(b) by 0 days.

(21) Appl. No.: 15/444,241

(22) Filed: Feb. 27, 2017

(65) Prior Publication Data

US 2017/0248553 A1  Aug. 31, 2017

Related U.S. Application Data

(60) Provisional application No. 62/300,049, filed on Feb. 25, 2016.

(51) Int. Cl.
| | |
|---|---|
| *G01N 29/22* | (2006.01) |
| *G01D 11/30* | (2006.01) |
| *G01N 29/44* | (2006.01) |
| *G01N 29/265* | (2006.01) |
| *G01N 29/24* | (2006.01) |
| *F16B 11/00* | (2006.01) |

(52) U.S. Cl.
CPC .......... *G01N 29/223* (2013.01); *F16B 11/006* (2013.01); *G01D 11/30* (2013.01); *G01N 29/225* (2013.01); *G01N 29/2418* (2013.01); *G01N 29/265* (2013.01); *G01N 29/4472* (2013.01)

(58) Field of Classification Search
CPC ............ G01N 29/223; G01N 29/2418; G01N 29/225; G01N 29/265; G01N 29/4472; G01N 2291/02475; G01D 11/30; F16B 11/006
USPC ......................................................... 73/649
See application file for complete search history.

(56) References Cited

U.S. PATENT DOCUMENTS 4,320,911 A * 3/1982 Wood .................... F16L 37/008
285/137.11
4,885,707 A * 12/1989 Nichol ................... G01H 1/003
235/375

(Continued)

FOREIGN PATENT DOCUMENTS

| CA | 2942994 C | * | 1/2019 | ............... A47G 1/17 |
| FR | 2561324 A1 | * | 9/1985 | ............ F16B 37/043 |

OTHER PUBLICATIONS

"Safetying" http://www.smittysrv.com/docs/safetywiring.pdf Par 7-122. p. 7-19. Section 7. Sep. 8, 1998. (Year: 1998).*

(Continued)

*Primary Examiner* — Mischita L Henson
*Assistant Examiner* — Monica S Young
(74) *Attorney, Agent, or Firm* — James Richards (57) ABSTRACT

A device and method for mounting sensors to components comprising a mounting pad adapted for adhesive attachment to the component and further including a feature allowing for a secondary restraint. In various variations, the sensor may be an accelerometer, vibration sensor, temperature sensor or other sensor. The feature and secondary restraint may include one or more holes in the mounting pad for attachment by safety wire or other restraint to provide limited movement in the case of adhesive failure.

23 Claims, 6 Drawing Sheets

(56) References Cited

U.S. PATENT DOCUMENTS

| | | | | |
|---|---|---|---|---|
| 5,116,178 A * | 5/1992 | Lerman | F16B 39/20 | |
| | | | | 403/316 |
| 5,484,217 A * | 1/1996 | Carroll | E01F 9/642 | |
| | | | | 248/548 |
| 5,884,432 A * | 3/1999 | DeLillo | E01F 13/06 | |
| | | | | 49/49 |
| 5,895,857 A | 4/1999 | Robinson et al. | 73/660 | |
| 5,911,392 A * | 6/1999 | Greenslate | A62C 35/68 | |
| | | | | 248/205.3 |
| 6,185,804 B1 * | 2/2001 | Burns | B25B 13/48 | |
| | | | | 29/264 |
| 6,754,569 B2 | 6/2004 | Bechhoefer | 701/29 | |
| 7,945,397 B2 | 5/2011 | Kar | 702/34 | |
| 7,973,654 B2 | 7/2011 | Ehrhart | 340/441 | |
| 8,355,879 B2 | 1/2013 | Bechhoefer | | |
| 8,596,117 B2 * | 12/2013 | Wilson | G01M 17/02 | |
| | | | | 73/146 |
| 2004/0237275 A1 * | 12/2004 | Werner | B25B 13/5083 | |
| | | | | 29/426.5 |
| 2005/0284225 A1 | 12/2005 | Luo | 73/593 | |
| 2007/0131063 A1 * | 6/2007 | Abdelgany | B25B 13/463 | |
| | | | | 81/63.1 |
| 2007/0188045 A1 * | 8/2007 | Ikeda | G01C 19/5607 | |
| | | | | 310/311 |
| 2011/0230304 A1 | 9/2011 | Morel | 475/331 | |
| 2011/0248143 A1 * | 10/2011 | Pierson | E01F 9/635 | |
| | | | | 248/548 |
| 2012/0217371 A1 * | 8/2012 | Abdollahzadeh | E05B 15/1607 | |
| | | | | 248/551 |
| 2014/0117059 A1 * | 5/2014 | Piety | B25B 13/48 | |
| | | | | 224/191 |
| 2014/0208876 A1 * | 7/2014 | Mattingly | G01D 11/30 | |
| | | | | 73/866.5 |
| 2017/0009936 A1 * | 1/2017 | Lan | A47G 1/17 | |
| 2017/0067361 A1 * | 3/2017 | Bynum | G02B 23/2476 | |
| 2017/0136279 A1 * | 5/2017 | Biddle | A63B 17/04 | |
| 2017/0214173 A1 * | 7/2017 | Blair | H01R 13/746 | |
| 2017/0313402 A1 * | 11/2017 | Flores | B64C 7/00 | |

OTHER PUBLICATIONS

US Joint Helicopter Safety Implementation Team, HFDM Working Group, "Health and Usage Monitoring Systems Toolkit", International Helicopter Safety Team, 2013, pp. 17-19.

US Army Research, Development, and Engineering Command. Aeronautical Design Standard Handbook Condition Based Maintenance System for US Army Aircraft, Mar. 7, 2013, pp. 100-103.

Laszlo Boros, RABA, Gyor, Hungary and Glenn H. BateBruel & Kjaer "Application Note, Early Detection of Gear Faults Using Vibration Analysis in a Manufacturer's Test Department" Web document downloaded May 1, 2015, pp. 2-4.

Marianne Mosher, Anna H. Pryor, and David G. Lewicki, NASA/TM-2003-212269 "Detailed Vibration Analysis of Pinion Gear with Time-Frequency Methods" National Aeronautics and Space Administration Ames Research Center Moffett Field, California, Jun. 2003, pp. 5-7.

* cited by examiner

SENSOR MOUNTING PAD WITH SECONDARY RESTRAINT FEATURE

RELATED APPLICATIONS

This application claims the benefit under 35 USC 119(e) of provisional application Ser. No. 62/300,049, titled: "SENSOR MOUNTING PAD WITH SECONDARY RESTRAINT FEATURE", filed Feb. 25, 2016 by Potts, which is hereby incorporated herein by reference in its entirety.

TECHNICAL FIELD

The present invention pertains generally to the field of instrumentation, and in particular, the mounting of sensors.

BACKGROUND

The ability to collect data from sensors that respond to various physical properties and events is a fundamental requirement of most technological systems.

Many of these sensors (e.g., accelerometers and temperature sensors) must be affixed to other system components in order to function properly. The quality of this attachment can affect the quality of the sensed data. The location where the sensor is affixed and its orientation are also often important because the physical quantity (e.g., vibration or temperature) being sensed varies by location and/or orientation on the component.

Reliable attachments are particularly important in systems and environments (e.g., aircraft and industrial machinery) where loose debris is dangerous. A detached sensor can become a significant hazard in the presence of components such as rotating shafts or turbine engines.

BRIEF DESCRIPTION

The present disclosure generally relates to a device and method for mounting sensors to components comprising a mounting pad adapted for adhesive attachment to the component and further including a feature allowing for a secondary restraint. In various variations, the sensor may be an accelerometer, vibration sensor, temperature sensor or other sensor. The feature and secondary restraint may include one or more holes in the mounting pad for attachment by safety wire or other restraint to provide limited movement in the case of adhesive failure. In one variation, a sensor is attached to the mounting pad via a mechanical fastener.

The sensor-mounting-pad mounting surface may be parallel to the mounting-pad-component mounting surface. In an alternative, the sensor-mounting-pad mounting surface is angled with respect to the mounting-pad-component mounting surface.

In various alternatives, the mounting pad may be made from aluminum, stainless steel, carbon steel, alloy steel, another metal, a ceramic, or another material.

In various alternatives, the mounting pad may have treatments such as bluing, anodizing, or other treatments applied to all or some of its surfaces.

The sensor may be attached to the mounting pad via a one-piece mechanical fastener (e.g., a bolt or a clip), a multi-piece mechanical fastener (e.g., a nut and bolt), an adhesive, or another attachment mechanism. A security mechanism such as a thread-locking fluid, a lock wire, a locking washer, or another mechanism may be used.

In various alternatives, this disclosure describes a mounting pad for attachment of a vibration sensor to a component for vibration analysis, said mounting pad comprising:
a block having a first surface prepared for adhesive mounting of said block to said component, said first surface for coupling vibration of said component to said block; said block having no threaded attachment for mounting said block to said component;
said block having a second surface for receiving attachment of said vibration sensor to said block, said block having a threaded recess for threaded attachment of said vibration sensor to said block; said threaded recess having a closed bottom for preventing entry of adhesive to said recess from said first surface; said second surface for coupling vibration of said block to said vibration sensor;
said block having a safety feature for coupling to a safety cable to limit movement of said block in an event of an adhesive failure of said adhesive attachment;
said block having a counter torque feature adapted for coupling to a tool for applying counter torque to counteract torque applied while mounting or unmounting said vibration sensor using said treaded attachment of said vibration sensor to said block.

Also disclosed are various related methods, including:

A method for mounting a sensor on a device comprising steps in no particular order:
forming a mounting pad block for mounting said sensor on said device;
forming a mounting surface on said block;
adapting said mounting surface for adhesively mounting said block to said device;
forming a threaded hole feature in said block, said threaded hole partially penetrating a thickness of said block and not fully penetrating the thickness of said block;
forming a through hole in said block, said through hole not penetrating said mounting surface;
forming a counter torque feature in said block;
adhesively mounting said block on said device;
threading a safety wire through said through hole and attaching said safety wire to said device;
mounting a sensor on said block by using a threaded bolt with said threaded hole feature in said block; and
applying torque to said threaded bolt to secure said sensor on said block while applying opposite torque to said block using said counter torque feature on said block.

These and further benefits and features of the present invention are herein described in detail with reference to exemplary embodiments in accordance with the invention.

BRIEF DESCRIPTION OF THE FIGURES

The present invention is described with reference to the accompanying drawings. In the drawings, like reference numbers indicate identical or functionally similar elements.

DETAILED DESCRIPTION

Mechanical Fasteners

Traditionally, accelerometers have been mounted by way of mechanical fasteners such as bolts or screws. Advantages include secure, high strength, reliable fastening with ease of removal and replacement. However, in some applications such as vehicle health monitoring, there are very few locations where a bolted connection is possible. Gearboxes, engines, and transmission casings often cannot be drilled and tapped for a threaded sensor installation in an aftermarket installation where the installation was not designed in from the start. The desired location may not be possible either because of practical reasons or regulatory/certification reasons. Practically, the strength of the material may not support the cutting of threads to sufficient strength to enable a bolted connection, or the material may not have enough depth to allow a sufficient number of threads. Further, regulatory or certification agencies can also prohibit the modification of transmissions, gearboxes, or engines to facilitate sensor installation. Often, the only choice in mounting locations is where a mechanical fastener already exists, or a pre-threaded location.

Further, structural vibration modes may dictate the optimal or necessary location, and that location may not have available existing attachment points. In vibration monitoring, not all locations on a component transmit vibration equally. On any component, there are both nodes where vibration displacement is greatest, and antinodes where displacement is minimal or near zero. In determining where to instrument a component for vibration monitoring, it is important to locate the accelerometer near a node. This is done by resonance testing using special equipment. Pre-threaded or existing hardware locations may occasionally coincide with a vibration node, but often this is not the case.

Adhesive Mounting

By mounting accelerometers adhesively to the component of interest rather than using a bolt or screw, several advantages may be realized, including but not limited to: the location may be less limited, a smaller size may be possible, and fewer sensors may be needed.

Location less limited—adhesive mounting of the accelerometer possibly enables a location to be selected that coincides much closer with a vibration node. This removes the constraint to mount the sensor at a predefined location. Subject to practical considerations such as excessive temperature or mechanical interference from moving parts, the sensor may be mounted anywhere on the component of interest that will enable the best measurement of vibration.

Smaller size possible—the size of the accelerometer is no longer constrained by the dimension of an existing hardware size, and can typically be made much smaller. A smaller, lighter accelerometer changes the vibration characteristics of the component less, an effect known as mass loading. A lighter accelerometer is also an advantage for applications such as aircraft where higher weight negatively affects overall system capability.

Fewer sensors needed—with few or no constraints on mounting location, adhesive mounted sensors can be placed in optimal locations for monitoring multiple internal subcomponents on a gearbox, transmission, or engine. On large or complex assemblies, it is often necessary to monitor multiple bearings or gears. When limited to pre-existing mounting locations, it frequently becomes necessary to place more sensors than would otherwise be required if optimal locations could have been selected. Using an adhesive mounted approach, an engineer can perform an optimization to select a location having a transfer path to monitor all components of interest and eliminating superfluous sensors.

Safety Concerns if the Adhesive Fails

The failure of adhesively mounted sensors in a critical environment, such as on an aircraft, can have disastrous consequences. On an aircraft, the sensor and cable can interfere with critical engine or flight controls if they become dislodged. Very strong adhesives do exist which should prevent the sensor from coming loose; however, the uncontrolled environment in which they are applied can significantly reduce adhesive strength. Improper surface preparation or degreasing can result in a very weak bond. Too short a cure time before resumption of operation may also weaken the bond. Regulatory agencies responsible for aircraft/vehicle safety certification have been hesitant to approve adhesively mounted accelerometers because of the serious impact should they become disbonded.

Maintenance Challenges

Removal of the sensors may be required during the course of maintenance operations, either to replace the sensor or to facilitate maintenance of another device. An adhesively mounted sensor presents difficulties when it must be removed to facilitate maintenance. Gearboxes, transmissions, and engines must on occasion be removed or replaced, and any accelerometer mounted on the old component must be transferred to the newly installed component. Adhesively mounted accelerometers and protective finishes can easily be damaged during removal, since the bond must be either mechanically broken with force, or chemically dissolved with a solvent. Removing and re-attaching an adhesive mounted sensor significantly increases the maintenance burden of replacing the component to which it is attached.

Mounting Pad

In one variation, the sensor may be mounted on a mounting pad (alternatively referred to as a base) such that an accelerometer is attached by way of threaded hardware to a base, and the base is adhesively mounted on the object to be monitored. It is then possible to remove the accelerometer while leaving the base permanently attached. This will facilitate maintenance or accelerometer replacement without the need to break the adhesive bond.

Although adhesive bonded mounting pads are widely used in non-critical settings for accelerometers, they are not used in critical settings such as onboard aircraft. The likelihood of the base becoming disbonded is similar to the likelihood of a directly adhered accelerometer becoming disbonded. Should the adhesive fail, there is significant risk that the accelerometer, cable, and/or mounting pad could cause grave damage.

The adhesively bonded mounting pad may include attachment features, for example holes for safety wire or tapped holes for looped fasteners for safety wire or other flexible restraint that may be affixed to an appropriate bolt or other feature in the aircraft to prevent unlimited and hazardous free movement of the accelerometer should the adhesive bond fail.

During installation, the mounting pad is adhesively affixed to the desired position on the device. The safety wire may be threaded through the mounting pad safety wire hole or other feature and affixed to an anchor point on the equipment. In one variation, the anchor point may be on the same structure, potentially allowing the safety wire to remain in place even though the accelerometer may be removed during maintenance, depending on the circumstances.

The mounting pad may further include torque limiting features to reduce torque on the adhesive attachment during installation and removal of the sensor. The sensor may be mounted to the mounting pad by one or more bolts or other threaded attachments. The threaded attachments may require torque to install or remove the sensor. The mounting torque may potentially damage or debond the adhesive attachment layer.

The mounting pad may include a torsional restraint feature such as a hole, a notch, or flat sides that can be used to apply counter-torque to the pad while a sensor is affixed to the mounting pad with a threaded fastener or while such a sensor is removed. Applying torque to the sensor bolt while simultaneously applying torque of similar magnitude and opposite direction (counter-torque) to the mounting pad may result in greatly reduced or near zero torque applied to the adhesive bond, thereby reducing the likelihood that the adhesive bond will fail or be damaged during sensor installation or removal.

Use of the torsional restraint feature may require the use of a torsional restraint tool such as a pin, a hex wrench, any of various plyers, any of various wrenches, a specially designed tool, or another tool. The tool may be inserted into a hole or notch in the mounting pad body, mated with wrench flats on the outer edges of the mounting pad body, and/or mated with an alternative restraint feature in or on the mounting pad. As the sensor is being secured to the mounting pad using tightening torque, counter-torque can be applied in the opposite direction of the tightening torque by the torsional restraint tool to reduce the torsional shear stress applied to the adhesive from the tightening torque applied to the sensor fastener. The torsional restraint feature can also be used to apply counter-torque in the opposite direction of the loosening torque when removing the sensor fastener from the mounting pad to reduce the torsional shear stress applied to the adhesive from the loosening torque applied to the sensor fastener.

Figure 1:
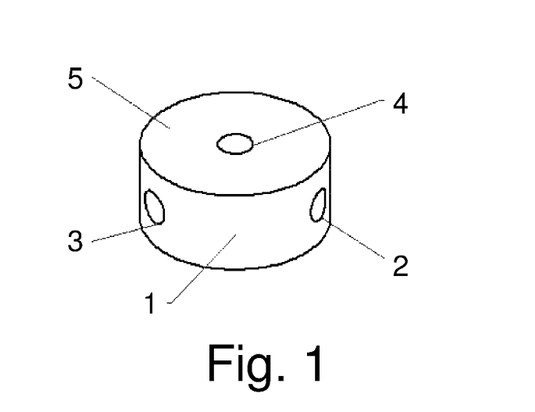
FIG. 1 shows a perspective view of an exemplary mounting pad adapted for secondary restraint.

FIG. 1 shows a perspective view of an exemplary mounting pad adapted for secondary restraint. The mounting pad 1 may have a circular base typically 0.125 inch to 1 inch (3 to 25 millimeters) diameter while retaining a relatively small thickness, for example, but not limited to 3 to 5 millimeters (0.125 inch to 0.200 inch.) The mounting pad (also referred to as a block) may comprise medium carbon steel rod with corrosion resistant coating for good strength, toughness, and wear resistance. However, other materials may be used, as needed.

The bottom surface (not visible in FIG. 1, but opposite and typically parallel to top surface 5) may be typically nominally flat, but may be conformal to a desired surface of a particular installation. The bottom surface may be textured or may be treated by etching or priming or other treatment for optimal adhesion of a desired adhesive system.

The top mounting surface 5 may be perpendicular to the curved surface edges of mounting pad 1, and the top surface 5 may have a smooth machine finish. The accelerometer mounting hole 4 (recess 4) is typically partially threaded, located at the center of surface 5, and preferably does not completely pass through the body (thickness) of the mounting pad 1. The mounting hole 4 extending partially through the thickness, i.e., closed on the bottom end, prevents a mounting screw from inadvertently pushing through, lifting the mounting pad 1, and delaminating the adhesive mounting. Further, the blocked end of the mounting hole 4 prevents adhesive from filling the mounting hole 4. Located on the curved surface edges of the mounting pad 1 is a torsional restraint hole 2 which may be unthreaded and centered vertically with the height of the mounting pad 1. FIG. 1 shows safety wire hole 3. One or more safety wire holes may be provided. Safety wire hole 3 opposite torsional restraint hole 2 passes completely through mounting pad 1, and may be centered vertically with the height of the mounting pad 1 with an axis parallel to the bottom or top surface 5. A safety wire, not shown, may be threaded through the hole and tied or otherwise connected to nearby structure to prevent potentially hazardous movement of the mounting pad and sensor in the event of an adhesive bond failure. The safety wire may be any metallic, plastic, fiber or other string, chord or wire of one or more strands, collectively referred to as "safety wire" in this disclosure.

Figure 2:
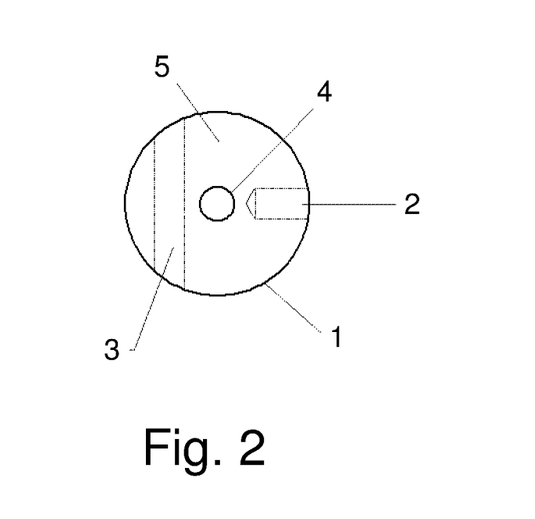
FIG. 2 displays a top view of the mounting pad of FIG. 1.

FIG. 2 displays a top view of the mounting pad of FIG. 1 with hidden lines shown for clarity. The torsional restraint hole 2 is parallel with the top surface, and has a depth that does not obstruct the accelerometer mounting hole 4. Note that the safety wire hole 3 is completely through the mounting pad 1 and is opposite and perpendicular to the torsional restraint hole 2. Observe that both the torsional restraint hole 2 and the safety wire hole 3 have centerlines that are perpendicular to one another.

Figure 3:
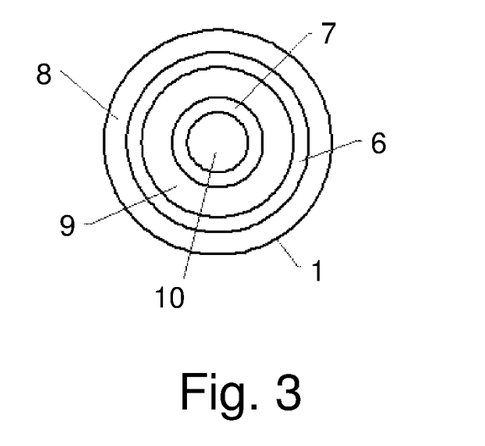
FIG. 3 shows a bottom view of the mounting pad of FIG. 1.

FIG. 3 is a bottom view of the mounting pad of FIG. 1 showing circular cuts into the bottom surface that are very small in depth and width at locations 6 and 7. Note these cut outs are located on the same plane offset into the body of mounting pad 1 away from the surfaces at locations 8, 9, and 10. The bottom surfaces of mounting pad 1 are typically not smoothly machine finished, leaving a texturized adhesion surface. The groove cutouts help with the adhesion and lateral strength of an adhesive. Other groove patterns including radial and mesh patterns may be used. In addition, chemical etching or primers may be applied to prepare for the adhesive. In a further alternative, the bottom surface contour may be conformal to a desired installation, for example, but not limited to a spherical or cylindrical curvature. For this disclosure, the term flat or substantially flat referring to the adhesive bond surface may include surfaces having texture or patterns for improving adhesive bond strength. Parallel to the adhesive bond surface would be parallel to a plane through an average surface, averaging out the texture. Note that hole 4 of FIG. 2 is not shown because hole 4 does not penetrate the bottom surface shown in FIG. 3.

Figure 4:
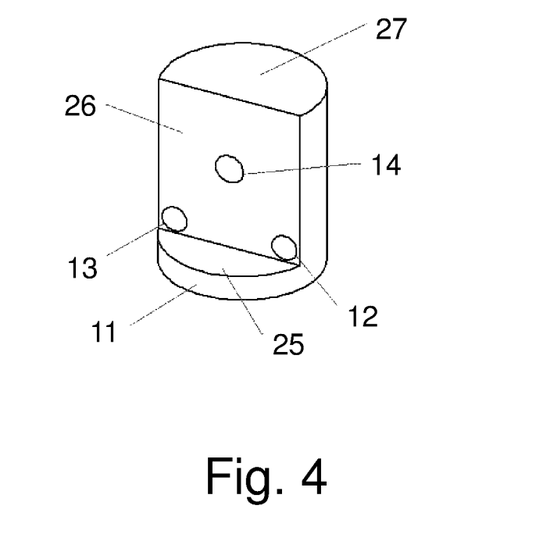
FIG. 4 shows a perspective view of an exemplary 90 degree mounting pad with a safety wire hole.

FIG. 4 shows a perspective view of an exemplary alternative variation for a 90 degree mounting pad. The 90 degree mounting pad 11 may have a circular base typically 3 to 25 mm, 0.125 in to 1 in., with an increased height larger than the FIG. 1 embodiment 1 usually in a range from 8 to 25 mm, 0.35 in to 1 in. The 90 degree mounting pad 11 may comprise a medium carbon steel rod with corrosion resistant coating for good strength, toughness, and wear resistance. However, other materials may be used. The vertical mounting surface 26 is rotated 90 degrees from the FIG. 1 top mounting surface 5, and may comprise a smooth machine finish as desired for mounting an accelerometer. Surface 25 is parallel to the top surface 27. A longitudinal cut out from surface 25 moving up to surface 27 has been removed from the embodiment of mounting pad 11, and the remaining surface after removal of material is surface 26. Accelerometer threaded mounting hole 14 is centered vertically and horizontally on mounting surface 26 with one or more safety wire holes 12 and 13 located, for example in the bottom left and right corners.

Figure 5:
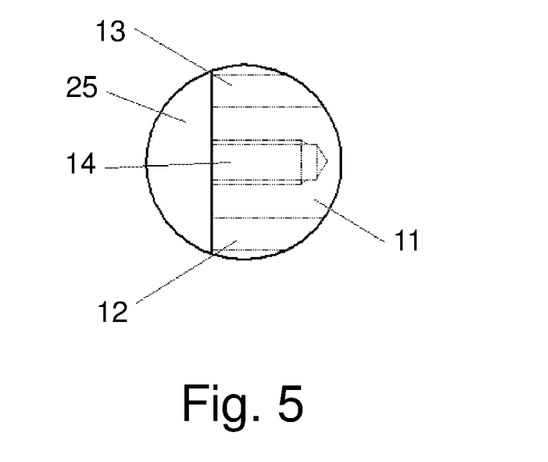
FIG. 5 shows a top view of the exemplary 90 degree mounting pad.

FIG. 5 displays a top view of the exemplary 90 degree mounting pad 11 with hidden lines shown for clarity. The two safety wire holes 12 and 13 are through-holes in the mounting pad embodiment 11 displayed as hidden lines. The accelerometer mounting hole 14 is threaded and may not completely pass through the exemplary mounting pad embodiment 11. Note holes 12, 13, and 14 have centerlines that are parallel.

Figure 6:
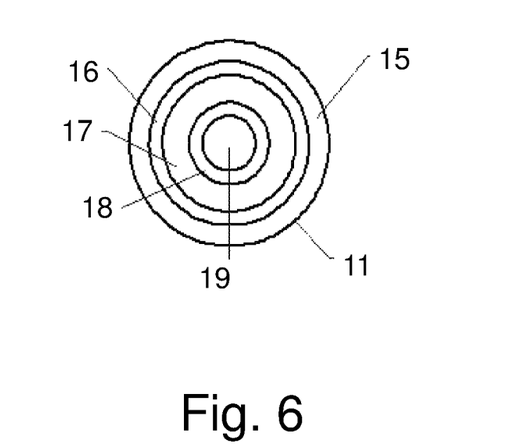
FIG. 6 shows a bottom view of the exemplary 90 degree mounting pad.

FIG. 6 shows a bottom view of the exemplary 90 degree mounting pad 11 showing circular cuts into the bottom surface that are very small in depth and width at locations 16 and 18. Note these cut outs are located on the same plane and offset into the body of mounting pad 1 away from the surfaces at locations 15, 17, and 19. The bottom surfaces of mounting pad 1 are unfinished or prepared for adhesive leaving a rough texturized adhesion surface.

Figure 7:
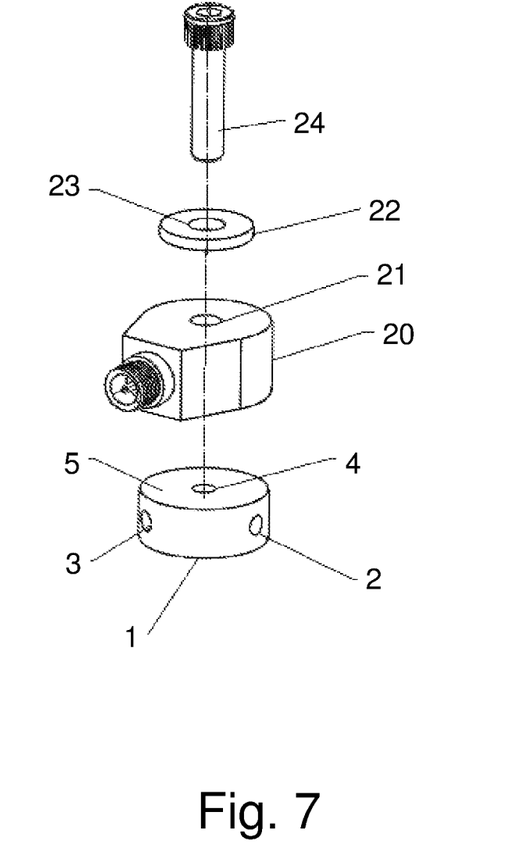
FIG. 7 shows an exploded view of the exemplary mounting pad with a mounting screw, washer, and accelerometer.

FIG. 7 shows an exploded view of exemplary mounting pad 1 with mounting screw 24, washer 22, and accelerometer 20. The mounting screw 24 feeds through center holes of the washer 22 and accelerometer 20 at locations 23 and 21, and threads into the accelerometer mounting hole 4. When fastened, the bottom face of the accelerometer 20 will be coincident with the top surface 5 of the mounting pad, and the bottom surface of washer 22 will be coincident with the top surface of accelerometer 20. Safety wire feasibly can be fed through safety wire hole 3 in a typical use case.

Figure 8:
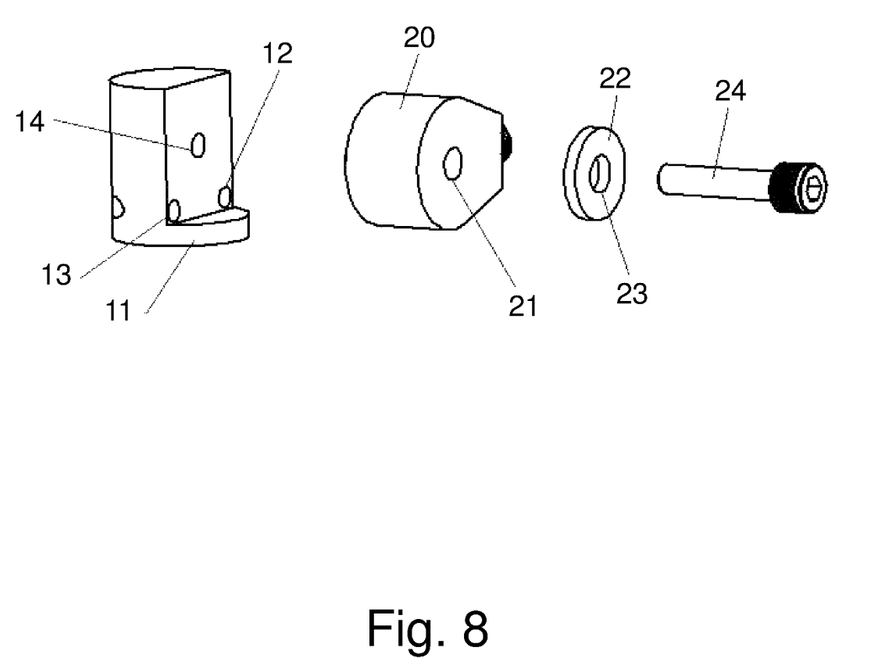
FIG. 8 shows an exploded view of the exemplary 90 degree mounting pad with a mounting screw, washer, and accelerometer.

FIG. 8 shows an exploded view of the 90 degree mounting pad 11 with mounting screw 24, washer 22, and accelerometer 20. The mounting screw 24 feeds through center holes of the washer 22 and accelerometer 20 at locations 23 and 21, and threads into the accelerometer mounting hole 14. When fastened, the bottom face of the accelerometer 20 will be coincident with the vertical mounting surface 26 (FIG. 4) of the mounting pad 11, and the bottom surface of washer 22 with be coincident with the top surface of accelerometer 20. Safety wire feasibly can be fed through safety wire hole 12 and 13 in a typical use case.

Figure 9:
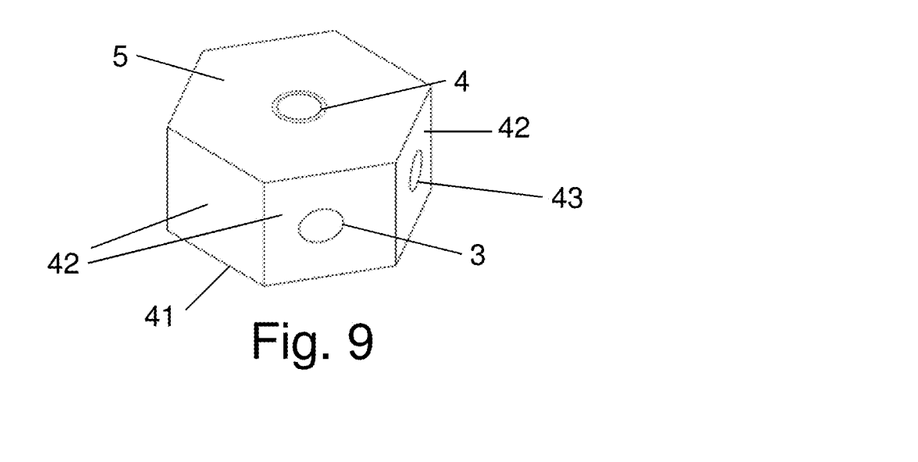
FIG. 9 is a perspective view of an alternative embodiment of a mounting pad with flat sides and two safety wire holes.

FIG. 9 illustrates an alternative exemplary embodiment of a flat mounting pad 41 with flat sides 42, a safety wire hole 3, and a second safety wire hole 43. The flat sides 42, typically in opposing parallel pairs, may be separated by a distance (width) typically 3 mm to 25 mm, 0.125 inch to 1 inch and may be arranged suitable of use with a wrench, socket, or similar tool. Other features and attributes are illustrated based on the features of the mounting pad 1 shown in FIG. 1 and FIG. 2.

Figure 10:
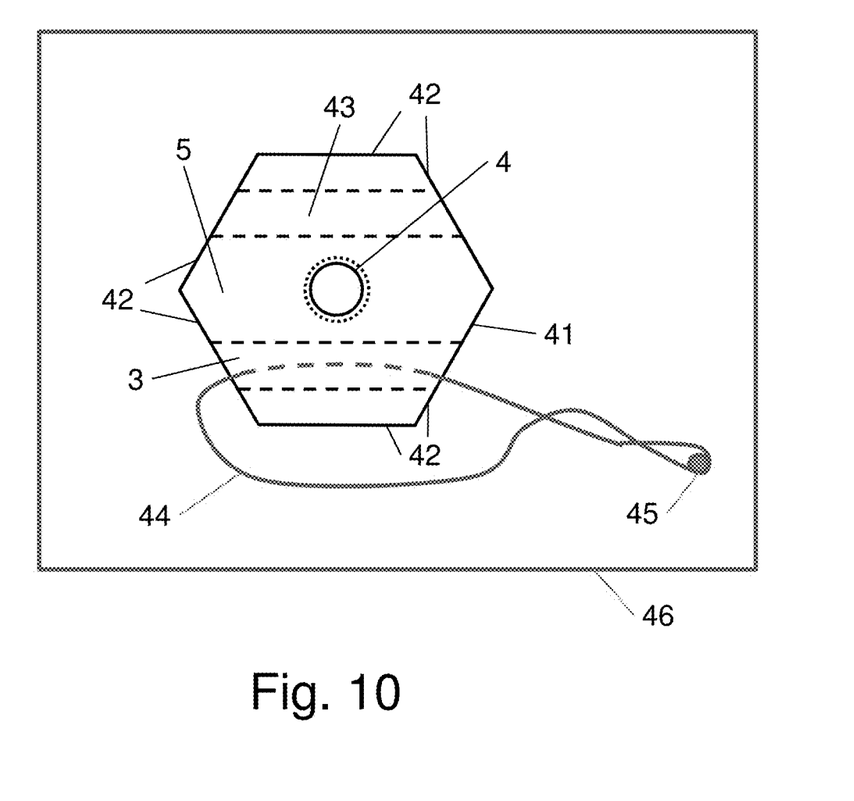
FIG. 10 is a top view of the alternative embodiment of FIG. 9.

FIG. 10 illustrates a top view of the exemplary mounting pad 41 of FIG. 9. Note that the safety wire hole 3 and the second safety wire hole 43 are completely through the mounting pad 41, parallel with each other, and parallel with the top mounting surface 5. The restraint feature is shown exemplified by a safety wire 44 threaded through hole 3 of block 41 and attached to device 46 at point 45.

Applications

The present disclosure is well adapted to affixing accelerometers to aircraft components for vibration health monitoring (VHM). The application, however, may extend generally to aircraft, automotive, rail, and marine applications as well as industrial machinery or other products using VHM. The application may further extend to other non-VHM uses where there is a need to securely affix various sensors to various components at locations not well suited to traditional mechanical fasteners.

Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

DRAWING REFERENCE NUMERALS

1. Flat Mounting Pad Embodiment
2. Torsional Restraint Hole
3. Safety Wire Hole of Flat Mounting Pad
4. Accelerometer Mounting Hole of Flat Mounting Pad
5. Top Surface of Flat Mounting Pad
6. Outer Bottom Cutout Groove of Flat Mounting Pad
7. Inner Bottom Cutout Groove of Flat Mounting Pad
8. Outer Bottom Contact Surface of Flat Mounting Pad
9. Middle Bottom Contact Surface of Flat Mounting Pad
10. Center Bottom Contact Surface of Flat Mounting Pad
11. 90 Degree Mounting Pad Embodiment
12. Right Safety Wire Hole of 90 Degree Mounting Pad
13. Left Safety Wire Hole of 90 Degree Mounting Pad
14. Accelerometer Mounting Hole of 90 Degree Mounting Pad
15. Outer Bottom Contact Surface of 90 Degree Mounting Pad
16. Outer Bottom Cutout Groove of 90 Degree Mounting Pad
17. Middle Bottom Contact Surface of 90 Degree Mounting Pad
18. Inner Bottom Cutout Groove of 90 Degree Mounting Pad
19. Center Bottom Contact Surface of 90 Degree Mounting Pad
20. Accelerometer
21. Accelerometer Through-Hole
22. Washer
23. Washer Through-Hole
24. Screw
25. Lower Horizontal Surface of 90 Degree Mounting Pad
26. Vertical Mounting Surface of 90 Degree Mounting Pad
27. Top Horizontal Surface of 90 Degree Mounting Pad
41. Alternative Flat Mounting Pad Embodiment
42. Torsional Restraint Surface
43. Second Safety Wire Hole
44. Safety wire
45. Safety wire attachment to the device
46. Device, alternatively referred to as component

What is claimed is:

1. A mounting pad for attachment of a sensor to a component for an analysis, said mounting pad comprising:
   a block having an adhesive mounting surface prepared for adhesive mounting of said block to said component by application of adhesive therebetween;
   said mounting pad further including said adhesive, said adhesive bonded to said block and to said component;
   said block and said component having no threaded connection therebetween;
   said block having a sensor attachment surface for receiving attachment of said sensor to said block, said block forming a threaded hole for attachment of said sensor to said block, said threaded hole having an opening on said sensor attachment surface;

said mounting pad further including a safety restraint having a first portion and a second portion, said first portion securely attached to said block and said second portion; wherein the second portion of the safety restraint is at least one of a fixed component feature, a bolt or a threaded fastener; said first portion of said safety restraint not providing added tension to support adhesive attachment; said safety restraint thereby limiting movement of said block relative to said component after an event of an adhesive failure of said adhesive;

said mounting pad further comprising a counter torque surface or recess of said block for receiving a counter torque tool applied simultaneously when sensor mounting torque is applied to reduce total torque transmitted to said adhesive during mounting of said sensor;

wherein said sensor is a vibration sensor coupled to said component through said mounting block, said coupling capable of transmitting vibration from said component, and said analysis is a vibration analysis relating to vibration of said component.

2. The mounting pad as recited in claim 1, wherein said threaded hole is a threaded through hole through said block, said through hole having two openings with neither opening on said adhesive mounting surface.

3. The mounting pad as recited in claim 1, wherein said threaded hole has a closed end.

4. The mounting pad as recited in claim 1, wherein
said safety restraint is attached to said block by passing through a hole through said block with openings not fully obscured by said component or said sensor when said block is attached to said component and said sensor; and
said safety restraint comprises a safety wire.

5. The mounting pad as recited in claim 1, wherein said counter torque recess of said block comprises a counter torque hole formed into and not completely through said block and not perpendicular to said sensor attachment surface.

6. The mounting pad as recited in claim 1, wherein said counter torque surface of said block comprises two parallel flat surfaces of said block, perpendicular to said sensor attachment surface, and said counter torque tool comprises a wrench.

7. The mounting pad as recited in claim 6, wherein said block is hexagonal and said two parallel flat surfaces are two faces of said hexagonal block.

8. The mounting pad as recited in claim 1, wherein said sensor attachment surface is parallel to said adhesive mounting surface.

9. The mounting pad as recited in claim 1, wherein
said sensor attachment surface is perpendicular to said adhesive mounting surface; and said block consists of a single solid piece;
wherein said sensor attachment surface is inset from a perimeter of said adhesive mounting surface.

10. The mounting pad as recited in claim 1, wherein said adhesive mounting surface has a pattern to improve adhesive bonding.

11. The mounting pad as recited in claim 10, wherein said pattern comprises groove cutouts.

12. The mounting pad as recited in claim 1, wherein said adhesive mounting surface has a chemical treatment to improve adhesive bonding.

13. A method for mounting a sensor on a device comprising steps in no particular order:
forming a mounting pad block for mounting said sensor on said device;
forming an adhesive mounting surface on said block for adhesively mounting said block to said device;
forming a sensor mounting surface on said block;
forming a threaded hole in said block for fastening of said sensor on said sensor mounting surface;
forming a through hole in said block, said through hole not penetrating said adhesive mounting surface;
adhesively mounting said block on said device; said block and said device having no threaded connection therebetween;
and removably mounting said sensor on said block by using said threaded hole for fastening of said sensor on said sensor mounting surface;
threading a safety wire through said through hole and securely attaching said safety wire to said block and to said device with at least one of a fixed device feature, a bolt, or a threaded fastener;
said safety wire not providing added tension to support adhesive;
said safety wire thereby limiting movement of said block relative to said device after an event of an adhesive failure of said adhesive, said adhesive failure separating said block from said device;
said safety wire sufficient in strength and sufficient in secure attachment to support said block after said adhesive failure;
forming a counter torque surface or recess in said block; and
when said block is adhesively mounted to said device, said mounting of said sensor further comprises applying counter torque to said block using a tool applied to said counter torque surface or recess of said block while simultaneously applying sensor mounting torque to said threaded fastener to secure said sensor on said block; thereby reducing total torque coupled to said adhesive mounting surface;
wherein said sensor is a vibration sensor coupled to said device through said block, said coupling capable of transmitting vibration from said device, and said analysis is a vibration analysis relating to vibration of said device.

14. The method in accordance with claim 13, wherein
said threaded hole having an opening on said sensor mounting surface and not having an opening on said adhesive mounting surface; and
said mounting of said sensor comprises using a threaded fastener with said threaded hole in said block and applying mounting torque to said threaded fastener to secure said sensor on said block.

15. The method in accordance with claim 13, wherein said counter torque recess of said block comprises a counter torque hole formed in said block; and said block consists of a single solid piece; wherein applying said counter torque simultaneously with said mounting torque comprises: applying said counter torque using said counter torque hole formed in said block.

16. The method in accordance with claim 13, wherein said tool is a wrench; wherein said counter torque surface in said block comprises parallel flat surfaces of said block adapted for coupling to said wrench, wherein applying said counter torque simultaneously with said mounting torque comprises: applying said counter torque using said wrench.

17. The method in accordance with claim 16, wherein said block is hexagonal and said counter torque surface of said block is two faces of said hexagonal block; wherein applying said counter torque simultaneously with said mounting torque comprises: applying said counter torque using said two faces of said hexagonal block.

18. The method in accordance with claim 13, wherein said sensor mounting surface is parallel to said adhesive mounting surface.

19. The method in accordance with claim 13, wherein
said sensor mounting surface is perpendicular to said adhesive mounting surface; and said block consists of a single solid piece;
wherein said sensor mounting surface is inset from a perimeter of said adhesive mounting surface.

20. The method in accordance with claim 13, further including applying a pattern to said adhesive mounting surface to improve adhesive bonding.

21. The method in accordance with claim 20, wherein said pattern comprises groove cutouts.

22. The method in accordance with claim 13, further including applying a chemical treatment to said adhesive mounting surface to improve adhesive bonding.

23. The method in accordance with claim 13, further including:
removing said sensor from said block, while leaving said safety wire connected to said block and to said device.

\* \* \* \* \*